(12) United States Patent
Tien

(10) Patent No.: US 7,077,324 B2
(45) Date of Patent: Jul. 18, 2006

(54) MULTI-LINE BARCODE SCANNER WITH NO MOVING PARTS

(75) Inventor: Kai-Yuan Tien, Changhua (TW)

(73) Assignee: Riotec Corp., Taipei (TW)

( * ) Notice: Subject to any disclaimer, the term of this patent is extended or adjusted under 35 U.S.C. 154(b) by 0 days.

(21) Appl. No.: 10/393,250

(22) Filed: Mar. 21, 2003

(65) Prior Publication Data
US 2004/0182934 A1     Sep. 23, 2004

(51) Int. Cl.
*G02B 5/00* (2006.01)

(52) U.S. Cl. .............................. 235/462.32; 235/462.42

(58) Field of Classification Search ............. 235/462.1, 235/462.11, 462.2–462.25, 462.32, 462.35, 235/462.37, 462.42; 359/196, 204–205, 359/208; 250/235
See application file for complete search history.

(56) References Cited

U.S. PATENT DOCUMENTS

| | | | | |
|---|---|---|---|---|
| 3,988,573 A | * | 10/1976 | Hayosh et al. | 359/216 |
| 4,224,509 A | * | 9/1980 | Cheng | 235/462.34 |
| 4,999,482 A | * | 3/1991 | Yang | 235/462.34 |
| 5,202,784 A | * | 4/1993 | Reddersen | 359/196 |
| 5,479,011 A | * | 12/1995 | Rudeen et al. | 250/235 |
| 5,545,886 A | * | 8/1996 | Metlitsky et al. | 235/462.42 |
| 5,912,452 A | * | 6/1999 | Wiklof et al. | 235/472.01 |
| 5,945,670 A | * | 8/1999 | Rudeen | 250/235 |
| 6,059,189 A | * | 5/2000 | Detwiler et al. | 235/462.36 |
| 6,188,500 B1 | * | 2/2001 | Rudeen et al. | 359/196 |
| 6,247,648 B1 | * | 6/2001 | Katz et al. | 235/462.42 |
| 6,318,635 B1 | * | 11/2001 | Stoner | 235/462.45 |
| 6,981,643 B1 | * | 1/2006 | Tien | 235/462.01 |

* cited by examiner

*Primary Examiner*—Daniel Stcyr
*Assistant Examiner*—Kumiko C. Koyama
(74) *Attorney, Agent, or Firm*—Troxell Law Office, PLLC

(57) ABSTRACT

The multi-line barcode scanner with no moving parts includes a light source, a light condensing lens and a linear light receiver. When scanning light beams (maybe linear or strip-shaped light beams) emitted from the light source are projecting onto a barcode, the reflected images thereof are focused onto the linear light receiver by the light condensing lens. The characteristics of the structure are that at least one beam splitter and reflectors are disposed at the projecting path from the light source converted into scanning light beam to the barcode, so as to enable the scanner to project two or more scanning light beams onto a same barcode in a non-overlapping manner, thereby selecting a complete barcode image for decoding at a fastest speed and for further increasing the barcode reading rate from the barcode at different angles or positions.

9 Claims, 5 Drawing Sheets

(A)

(D)

(B)

(E)

(C)

(F)

MULTI-LINE BARCODE SCANNER WITH NO MOVING PARTS

BACKGROUND OF THE INVENTION (a) Field of the Invention

The invention relates to a multi-line barcode scanner with no moving parts, and more particularly, to a barcode scanner doesn't use any moving parts and be capable of simultaneously projecting two or more scanning light beams for scanning a barcode within a specific area. According to the structure, at least one beam splitter and reflectors are disposed at appropriate positions of the projecting path from the light source thereof converted into scanning light beams to the barcode, thereby obtaining two or more light beams for scanning the same barcode in a non-overlapping manner. It is not restricted by only one single scanning light beam scanning on fixed reading position.

(b) Description of the Prior Art

Referring to FIG. 5 showing a conventional schematic view of a prior barcode scanner with one scanning light beam (maybe linear or strip-shaped light beam), wherein the structure at least comprises a light source a, a light condensing lens b and a linear light receiver c (may be a linear CCD (charge coupled device) sensor, a linear CMOS (complementary metal-oxide semiconductor) sensor, or other area sensors made of same materials). The light source a, regardless of being a single light source or a dual light source (a dual light source structure is shown as an example in the diagram), the scanning light beams emitted therefrom are overlapped onto a same position, and therefore the scanner is classified as a single-line type scanner projecting one scanning light beam onto a barcode d. However, the aforesaid prior art has the shortcomings as described below. A fixed angle and position of the barcode are required for reading a barcode during scanning, and hence increasing the time cost for reading barcodes at counters in stores. In addition, not being able to read barcodes in an effective and fast way further increases the difficulty of users. Therefore, it is a vital task as how to reform the prior scanners.

There is another multi-line barcode scanner currently being used on the market, wherein behind a light source thereof is provided with a rotatable polyhedral mirror (as a moving part), a motor and a circuit for controlling the rotation thereof, or reflectors disposed in a crisscross pattern. The cost of such prior art is much higher than that of the former, and the entire structure and volume of a scanner with such design are also relatively much larger than those of common scanners, thus making scanner(s) short of mobility and practicability.

SUMMARY OF THE INVENTION

In the view of the aforesaid shortcomings of the prior arts, the object of the invention is to provide a multi-line barcode scanner with no moving parts. The scanner in accordance with the invention provides at least two scanning light beams scanning at different positions of a same barcode, and the reflected barcode images of the light beams are received by a linear light receiver. Thus the scanner can quickly, accurately and effectively select any one complete barcode image for reading, and thus increasing the handiness and practicability to the product.

To accomplish the above object, the invention comprises at least one beam splitter and reflectors disposed at positions of the projecting path from the light source thereof converted into scanning light beams (maybe linear or strip-shaped light beam) to the barcode. Thus the scanner obtains two or more light beams for scanning the same barcode in a non-overlapping manner and select a complete barcode image at a fastest speed for reading and decoding.

DETAILED DESCRIPTION OF THE PREFERRED EMBODIMENTS

To better understand the technical characteristics and functions of the multi-line barcode scanner with no moving parts in accordance with the invention, descriptions shall be given with the accompanying drawings hereunder.

Figure 1:
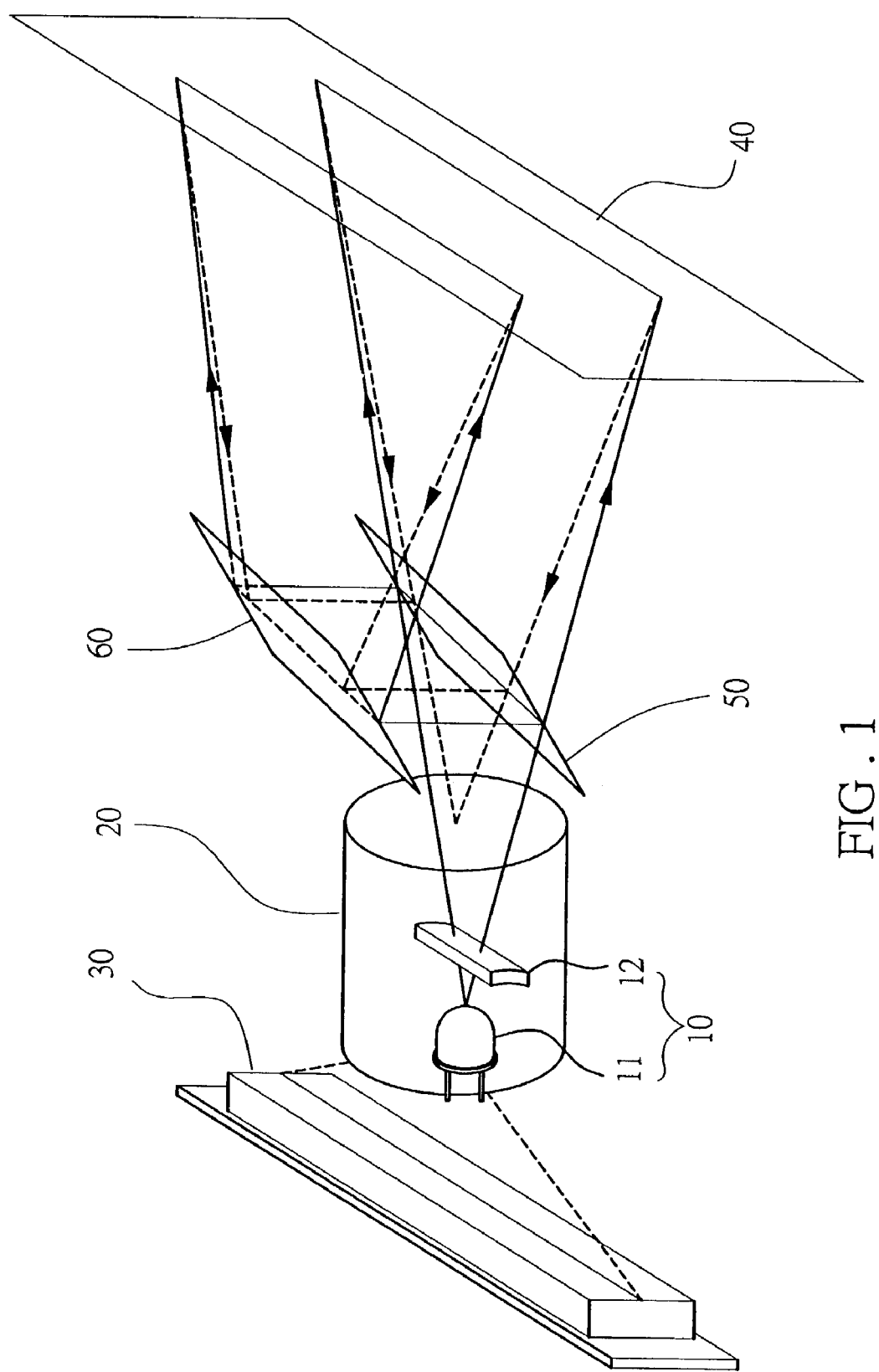
FIG. 1 shows an elevational schematic view of an embodiment illustrating the multi-line barcode scanner according to the invention.
Figure 2:
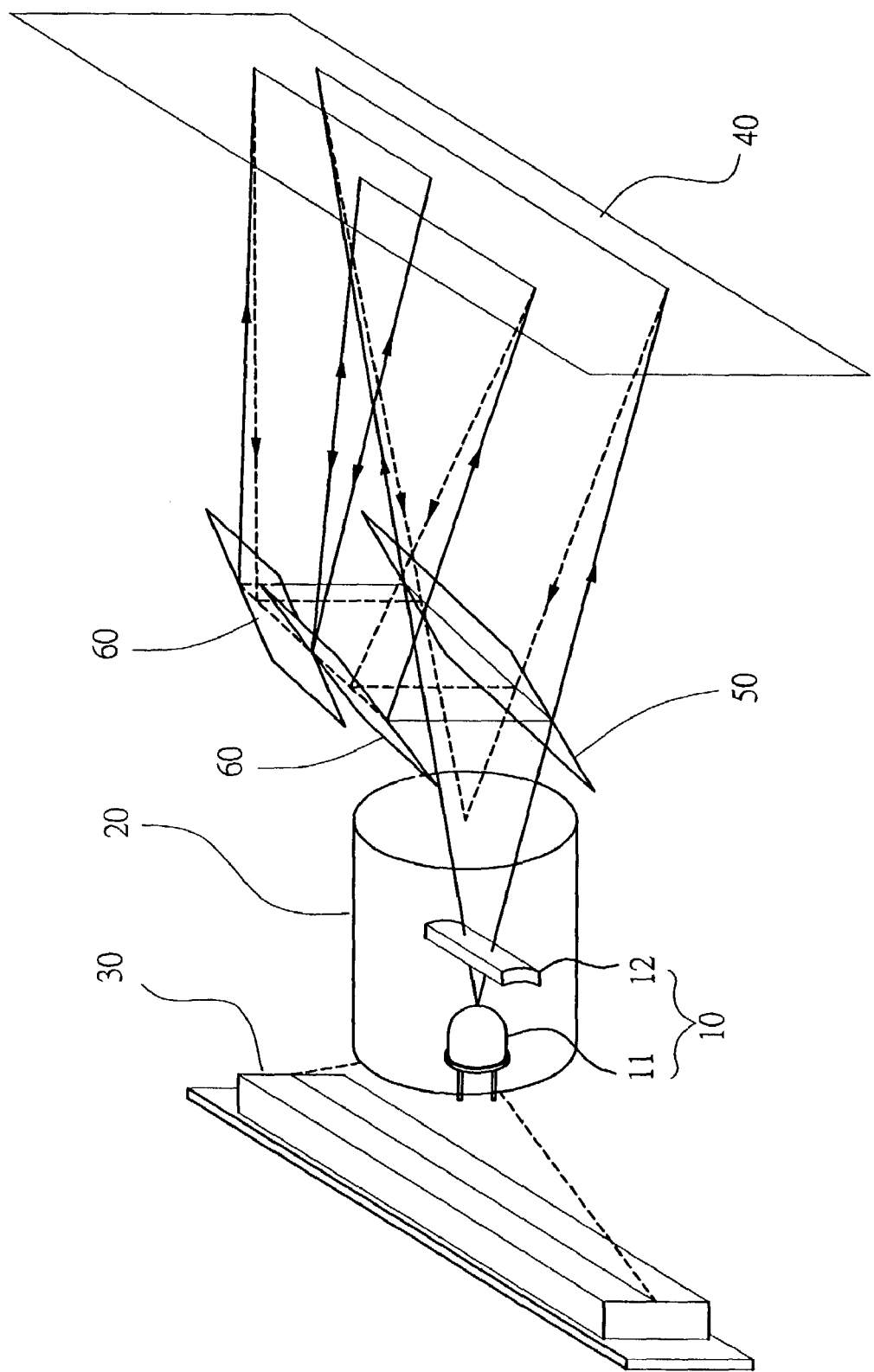
FIG. 2 shows another elevational schematic view of an embodiment illustrating the multi-line barcode scanner according to the invention.
Figure 3:
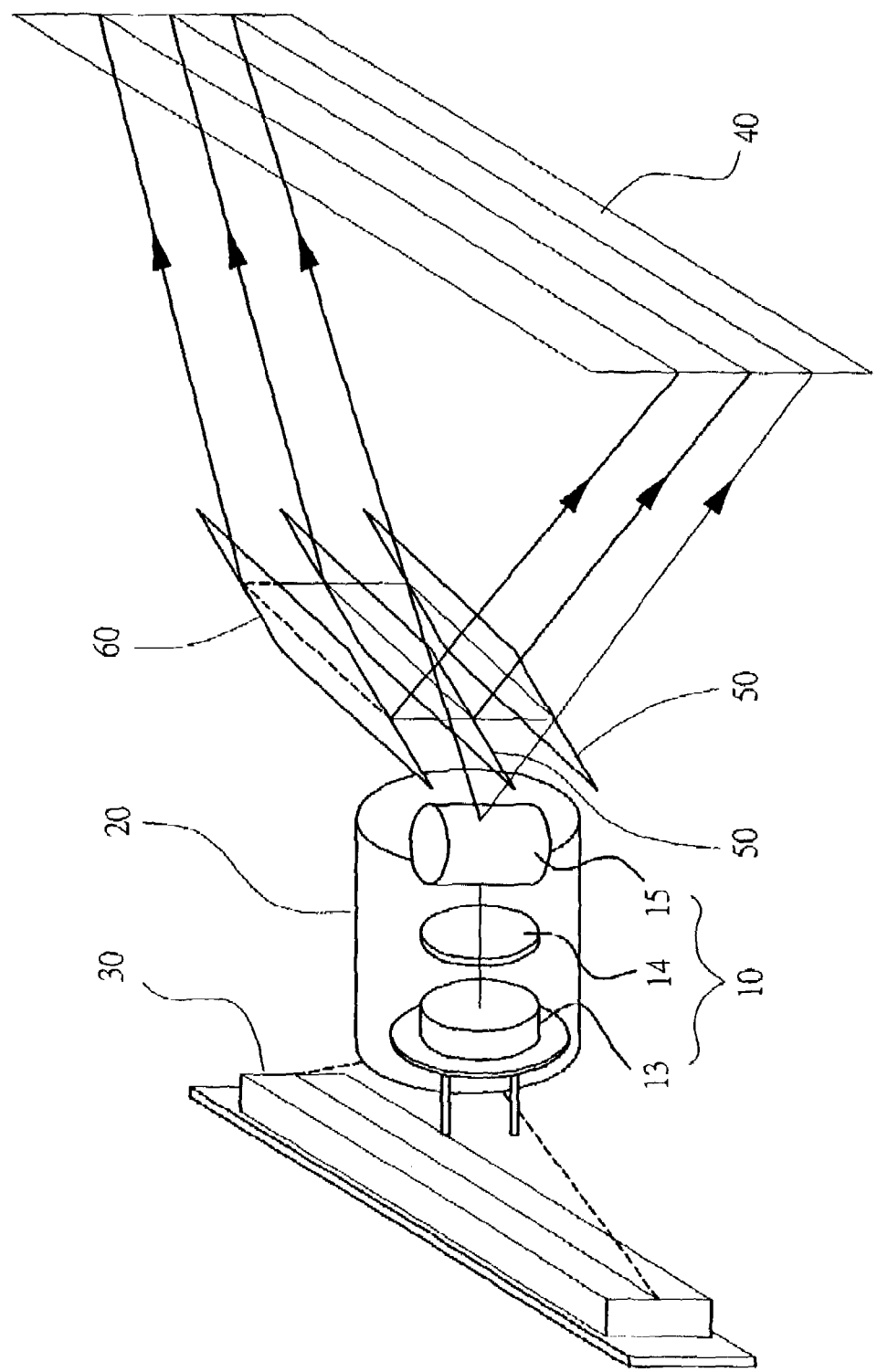
FIG. 3 shows another elevational schematic view according to the invention.

Referring to FIGS. 1 to 3, the multi-line barcode scanner with no moving parts according to the invention at least comprises a light source 10, a light condensing lens 20 and a linear light receiver 30. When the scanning light beams (maybe linear or strip-shaped light beams) emitted from the light source 10 are projecting onto a barcode 40, the reflected images thereof are focused onto the rear linear light receiver 30 by the light condensing lens 20, and barcode signal is_regenerated. The characteristics of the invention are that at least one beam splitter 50 and reflectors 60 are disposed at the projecting path from the light source 10 (may be strip-shaped light beam converted by plate-like convexo-concave lens 12 from the light beam emitted by an LED (Light Emitting Diode) 11; or may be linear light beam converted by a standing cylindrical lens 15 from dotted-shaped light beam generated from a laser emitter 13 with an aspherical collimator 14), to the barcode 40, so as to enable the scanner to simultaneously project two or more scanning light beams onto the region of the same barcode 40 in a non-overlapping manner; and the reflected images thereof then travel along the original light path and are focused by the light condensing lens 20 and received by the linear light receiver 30. Therefore, when use a scanner with the structure according to the invention to scan a barcode, even if the position or the angle of the barcode in the projection zone is deviated with one of the scanning light beams, as long as one of the other scanning light beams of the scanner is projecting onto the entire barcode 40 and get a complete barcode-image at the linear light receiver 30, barcode signal can still be produced.

As described above in the embodiment shown in FIG. 1, a beam splitter 50 is disposed with a titled angle at an appropriate position of the projection path from where the light source 10 is converted into scanning light beam (maybe linear or strip-shaped light beam), and a reflector 60 is disposed correspondingly at the reflection path from the beam splitter 50, such that a portion of the scanning light_beam emitted from the light source 10 is passing through the beam splitter 50 to directly project onto the barcode 40; and the other portion of scanning light beam is reflected toward the corresponding reflector 60 by the beam splitter 50, and is further reflected onto the same barcode 40 by the reflector 60. In addition, the two new scanning light beams are non-overlapping (as shown in FIG. 4A).

Referring to the embodiment shown in FIG. 2, wherein two reflectors 60 arranged at different angles next to each other are disposed correspondingly at the reflection path from the beam splitter 50, such that a portion of the scanning light beam is passing through the beam splitter 50 to directly project onto the barcode 40; and the other portion of scanning light beam is reflected toward the two corresponding reflectors 60 by the beam splitter 50, and two new derived scanning light beams are further reflected onto the same barcode 40 by the two reflectors 60, respectively. In addition, the three new scanning light beams are non-overlapping (as shown in FIG. 4B). The two aforesaid reflectors 60 may also be replaced by three or more reflectors for obtaining even more scanning light beams.

Referring to another embodiment shown in FIG. 3, a second beam splitter 50 and a reflector 60 are disposed correspondingly at the reflection path from the beam splitter 50, such that a portion of the scanning light beam is passing through first beam splitter 50 to directly project onto the barcode 40; and the other portion of scanning light beam is reflected toward the corresponding second beam splitter 50 and the reflector 60, and one portion of the scanning light beam is reflected onto the barcode 40 by the second beam splitter 50, while the other portion passing through the second beam splitter 50, is reflected by the reflector 60 onto the same barcode 40. In addition, the three new scanning light beams are non-overlapping (as shown in, FIG. 4C).

Figure 4:
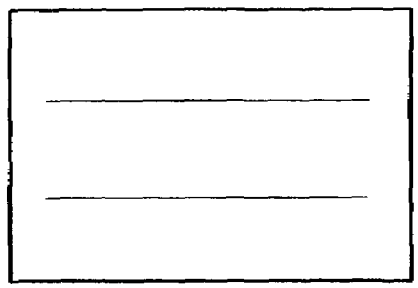
FIGS. 4A to 4F show several configurations of the scanning light beams projecting onto a barcode.
Figure 4:
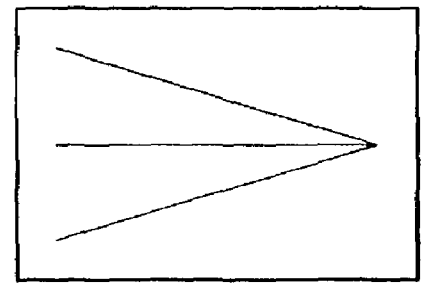
Figure 4:
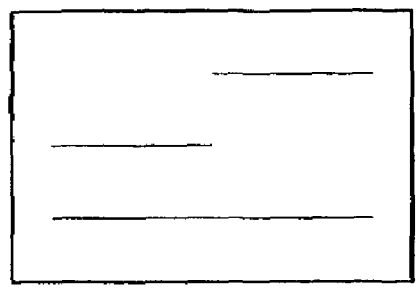
Figure 4:
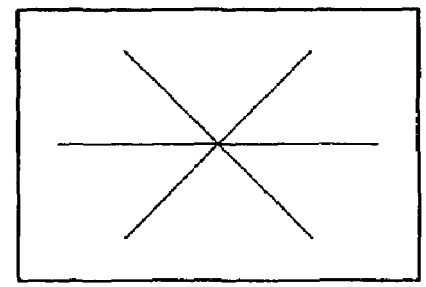
Figure 4:
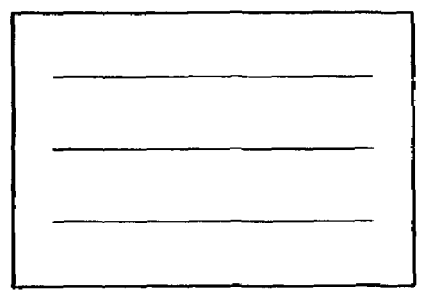
Figure 4:
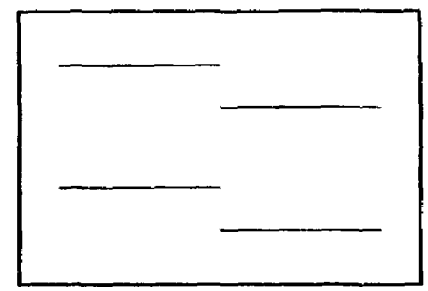
Figure 5:
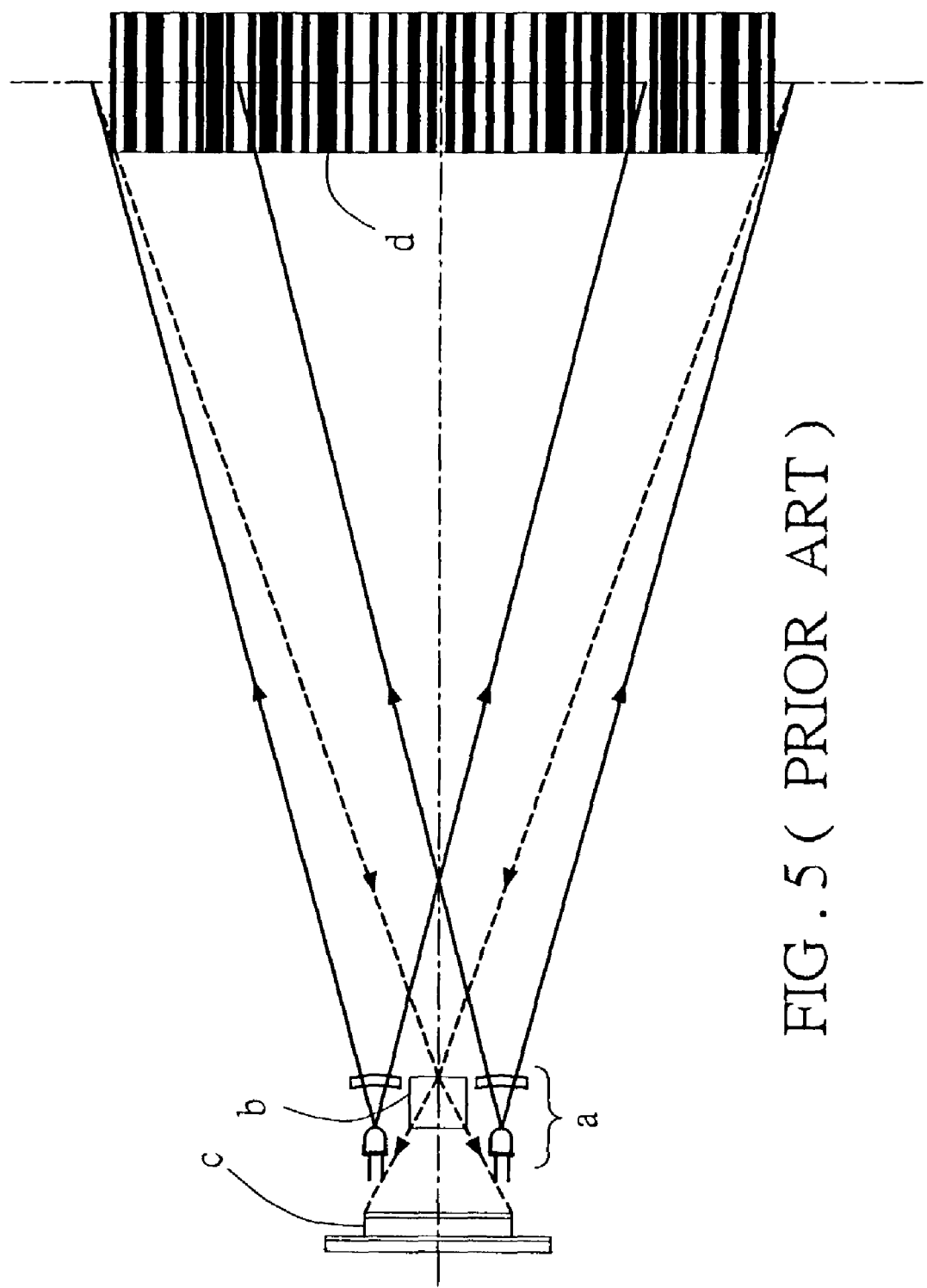
FIG. 5 shows a conventional top view of a prior structure.

Referring to the embodiment shown in FIG. 3 again, the titled angles of the second beam splitter 50 and the reflector 60 may also be adjusted such that the three scanning light beams project onto the barcode 40 as a crisscross pattern (as shown in FIG. 4D); or other equivalent techniques described in the aforesaid embodiments may be utilized such that the scanning light beams are arranged as indicated in FIGS. 4E and 4F for different using.

Conclusive from the above, the scanner according to the invention is capable of emitting two or more scanning light beams for scanning a same barcode 40 in a non-overlapping manner; applying the decoding method of common scanners, when the receiving plane of the linear light receiver 30 receives two or more barcode images, the decoder of the scanner will select the longest and most complete barcode image to decode, thereby completing the scanning thereof at a fastest and most accurately way.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A multi-line barcode scanner with no moving parts comprising:
   a) a light source emitting a light scanning beam;
   b) at least one reflector including a first reflector;
   c) at least one beam splitter including a first beam splitter located along a light path of the light scanning beam and splitting the light scanning beam into at least two light scanning beams including a first light scanning beam projected directly on a barcode and a second light scanning beam projected on the first reflector, the first reflector directly projects the second light scanning beam on the barcode, the first beam splitter and the first reflector each directly project one of three non-overlapping light scanning beams on the bar code;
   d) a linear light receiver; and
   e) a light condensing lens located between the linear light receiver and the barcode, and receiving images from the at least one beam splitter and the at least one reflector, and focusing the images on the linear light receiver such that the linear light receiver produce barcode signals, wherein each of the at least one reflector and each of the at least one beam splitter being located in a fixed position,
   wherein a third of the three non-overlapping light scanning beams is directly projected on the barcode by a device selected from a group consisting of a second beam splitter and a second reflector.

2. The multi-line barcode scanner with no moving parts in accordance with claim 1, wherein the light source is strip-shaped a light emitting diode light beam.

3. The multi-line barcode scanner with no moving parts in accordance with claim 1, wherein the light source is linear laser beam.

4. The multi-line barcode scanner with no moving parts in accordance with claim 1, wherein the linear light receiver is a linear charge coupled device (CCD) sensor.

5. The multi-line barcode scanner with no moving parts in accordance with claim 1, wherein the linear light receiver is a linear complementary metal-oxide semiconductor (CMOS) sensor.

6. The multi-line barcode scanner with no moving parts in accordance with claim 1, wherein the linear light receiver is a charge coupled device (CCD) area sensor.

7. The multi-line barcode scanner with no moving parts in accordance with claim 1, wherein the linear light receiver is a complementary metal-oxide semiconductor (CMOS) area sensor.

8. The multi-line barcode scanner according to claim 1, wherein the at least one beam splitter includes the second beam splitter located along a light path of the second light scanning beam and splitting a third light scanning beam from the second light scanning beam, the second light scanning beam projected through the second beam splitter onto the first reflectors, the first reflector directly projects the second light scanning beam on the barcode, and the second beam splitter directly projects the third light scanning beam on the barcode, the first beam splitter, the second beam splitter, and the first reflector each directly project one of the three non-overlapping light scanning beams on the barcode.

9. The multi-line barcode scanner according to claim 1, wherein the at least one reflector includes the second reflector, the at least two light scanning beams includes a third light scanning beam, the first beam splitter projects the third light scanning beam onto the second reflectors, the first reflector projects the second light scanning beam on the barcode, and reflector, the second reflector directly projects the third light scanning beam on the barcode, the first beam splitter, the first reflector, and the second reflector each directly project one of the three non-overlapping light scanning beams on the barcode.

* * * * *